T. A. ROSAMOND.
COTTON CHOPPER.
APPLICATION FILED MAR. 7, 1910.
966,057.
Patented Aug. 2, 1910.
2 SHEETS—SHEET 1.
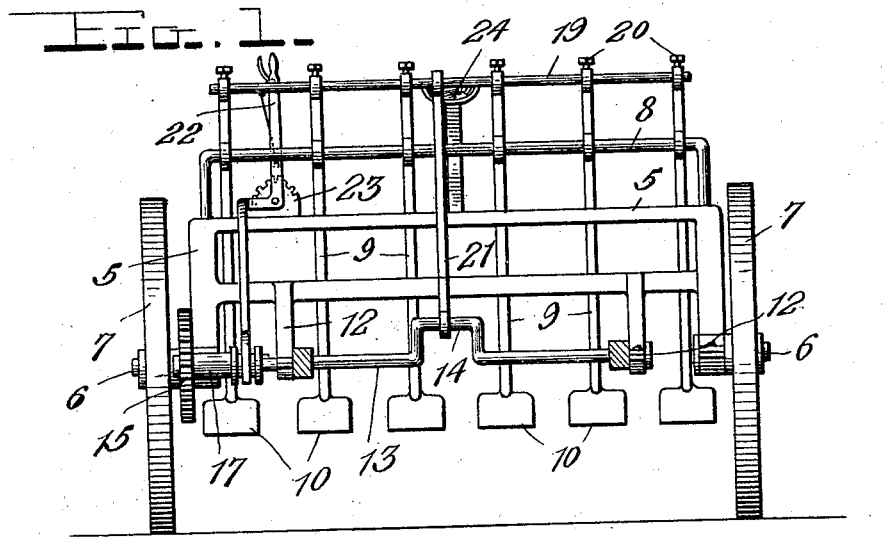
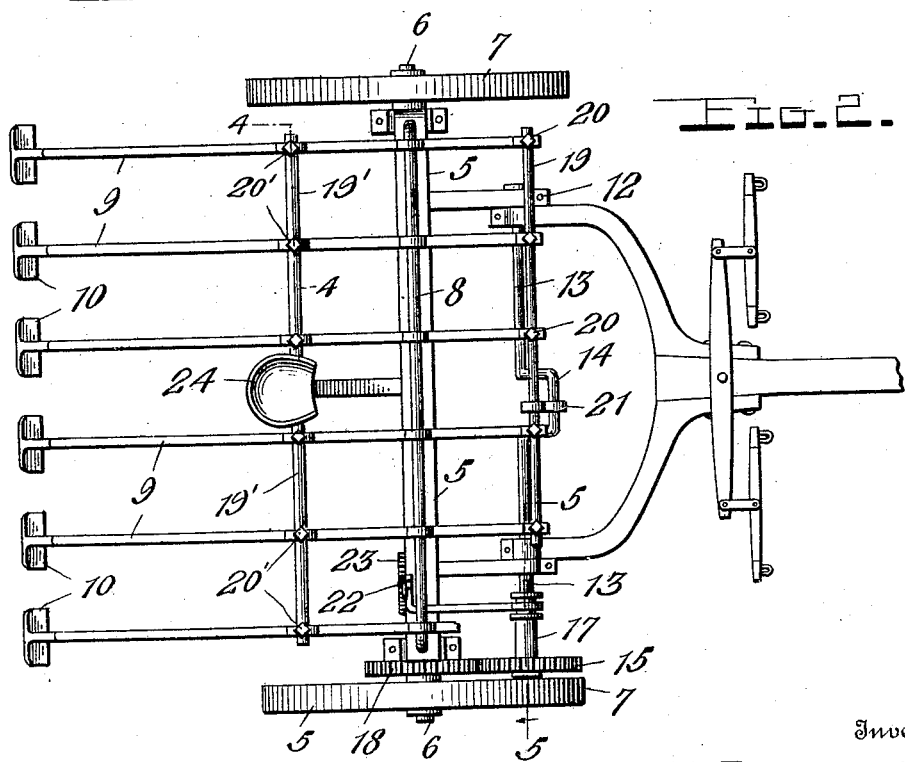
Witnesses
Chas. L. Griestauer.
E. M. Ricketts
Inventor
T. A. Rosamond,
By Watson E. Coleman
Attorney T. A. ROSAMOND.
COTTON CHOPPER.
APPLICATION FILED MAR. 7, 1910.
966,057.
Patented Aug. 2, 1910.
2 SHEETS—SHEET 2.
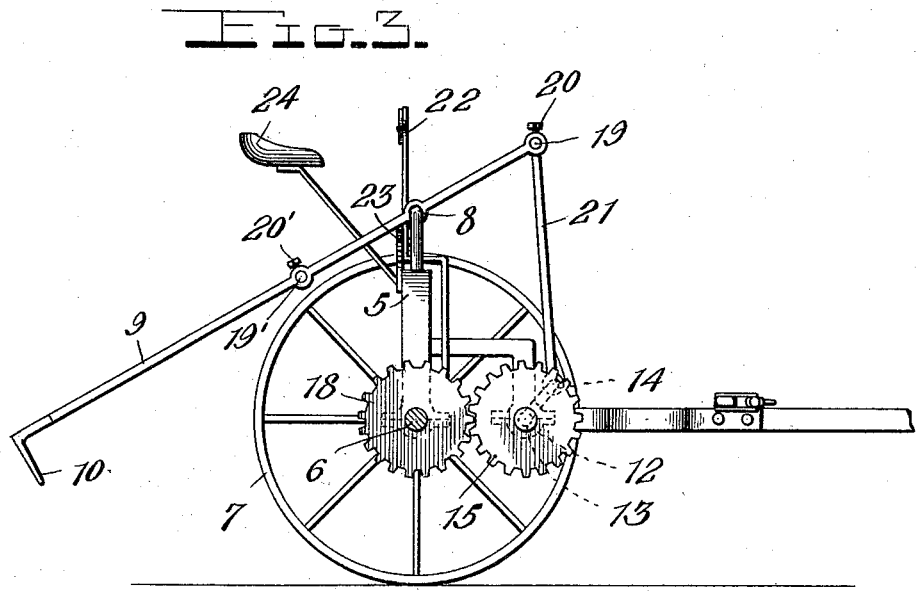
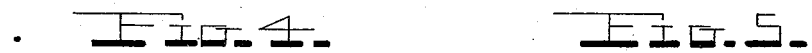
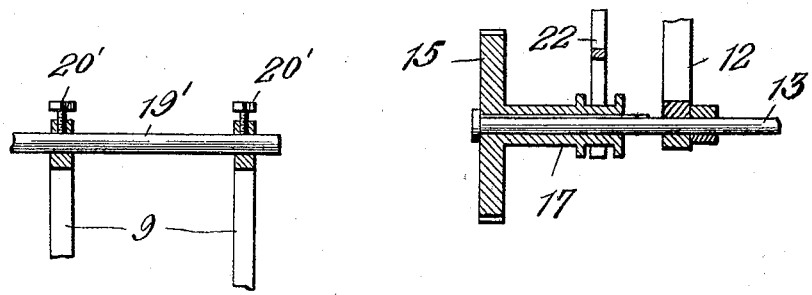
Witnesses
Chas. L. Griesbauer.
E. M. Ricketts.
Inventor
T. A. Rosamond,
By Watson E. Coleman
Attorney

UNITED STATES PATENT OFFICE.

TILLMAN A. ROSAMOND, OF HOT SPRINGS, ARKANSAS.

COTTON-CHOPPER.

966,057.  Specification of Letters Patent.  Patented Aug. 2, 1910.

Application filed March 7, 1910. Serial No. 547,800.

*To all whom it may concern:*

Be it known that I, TILLMAN A. ROSAMOND, a citizen of the United States, residing at Hot Springs, in the county of Garland and State of Arkansas, have invented certain new and useful Improvements in Cotton-Choppers, of which the following is a specification, reference being had to the accompanying drawings.

This invention relates to certain new and useful improvements in cotton choppers and has for its object to provide a simply constructed machine of this character whereby the superfluous cotton may be cut out from the rows thereby facilitating the growth of the remaining cotton to its full maturity.

Another object is to provide a wheeled frame having a plurality of oscillatory hoes mounted thereon, and a crank shaft journaled in said frame and gear to the wheel axle, the crank of said shaft being connected by a pitman to the hoe carrying frame to oscillate the same.

With these and other objects in view, Figure 1 is a front elevation of the machine embodying my improvements. Fig. 2 is a top plan view; Fig. 3 is a side elevation, one of the wheels being removed. Fig. 4 is an enlarged detailed section taken on the line 4—4 of Fig. 2; and Fig. 5 is the detailed section on the line 5—5 of Fig. 2.

Referring more particularly to the drawings 5 indicates a frame which may be of any preferred construction. This frame has secured in each of its ends a shaft 6 upon which the traction wheels 7 are revolubly mounted. In the top bar of the frame 5 the ends of a transversely extending rod 8 are secured. This rod has its intermediate portion disposed in spaced parallel relation to the top of the frame and a plurality of hoes 9 are mounted thereon for oscillatory movement. It will be noted from reference to Fig. 2 that the handles of the hoes are journaled upon the rod 8 adjacent to their ends, the hoe blades 10 which are secured to their outer extremities and positioned rearwardly of the machine frame being disposed adjacent to the cotton in the operation of the machine and adapted to engage therewith as the machine is drawn over the cotton rows, said blades being raised and lowered to cut out the superfluous cotton in the manner which will now be set forth.

Secured to the frame of the machine and extending forwardly therefrom adjacent to the traction wheels are suitable bearings 12. In these bearings the ends of the crank shaft 13 are journaled, said shaft being formed intermediate of its ends with the crank 14. A gear 15 is secured to the extremity of the tubular shank 17 which is slidably disposed upon one end of the crank shaft and is keyed thereon for rotative movement with the shaft in the operation of the machine. The gear 15 meshes with a similar gear 18 fixed on the wheel axle. The forward ends of the hoe handle are connected by means of the transversely extending rod 19. This rod is loosely disposed through the handles which are secured thereon by means of suitable set screws 20. A similar rod 19' is also disposed through the hoe handles intermediate of their ends and the hoes are secured thereon by means of set screws 20'. As the handles are loosely journaled upon the transverse rod 8, it will be obvious that they may be adjusted toward or from each other to increase or decrease the space between the adjacent hoe blades so that a greater or less quantity of cotton may be chopped as desired in varying circumstances. The crank 14 of the shaft 13 and the transverse rod 19 connecting the hoe handles are coöperatively connected by means of a pitman 21. It will therefore be seen that when the machine is drawn over the ground between the cotton rows, the hoe blades being disposed over the cotton plants, the rotation of the crank shaft will impart a vertical oscillatory movement to the hoes through the medium of the pitman 21, and the cotton will be rapidly and cleanly chopped whereby the liability of the plants becoming choked owing to a too extensive production and the consequent dwarfing of its growth, is overcome.

It very often happens in the production of cotton that in some places the rows will show a very thin growth while in other places the cotton will make its appearance in great quantities. Therefore it becomes necessary to provide a suitable means for throwing the hoe blades out of operation without retarding the forward progress of the machine. In the accomplishment of this result I provide the sliding gear 15 as above described and throw the same into and out of operative engagement with the gear 18 by means of the lever 22 the lower end of which is formed with a yoke adapted to embrace a collar rigidly secured upon the sleeve or shank 17 extending from said gear upon the end of the crank shaft 13. This lever is pivoted intermediate of its ends upon one side of the machine frame 5 and carries a manually actuated spring controlled dog which is adapted to be engaged in the teeth of the rack segment 23 whereby the gear 15, may be securely held in its operative position. Thus when the machine approaches one of the thin places in the cotton growth the driver has only to release the lever 22 and throw the same to move the gear 15 out of engagement with the gear 18, thus stopping the oscillatory movement of the hoe blades until the extent of the thin growth of cotton has been passed.

The driver's seat 24 is supported upon the frame of the machine in the usual manner adjacent to the lever 22 so that the same may be conveniently grasped and manipulated.

From the foregoing it is believed that the operation and many advantages of my improved cotton chopping machine will be obvious without necessitating a more extended description.

The machine is comparatively simple in construction and highly efficient in its operation. The adjustability of the hoe blades renders the machine adaptable for use at any period of the growth of the cotton, or upon rows of various widths.

While I have shown and described what I believe to be the preferable embodiment of my invention it will be understood that the same is susceptible of many minor modifications without departing from the essential features or sacrificing any of the advantages thereof.

I claim—

1. A machine of the character described comprising a wheel supported frame, a plurality of oscillatory hoes mounted upon said frame and extending upwardly and inwardly thereof, transverse rods connecting the hoe handles, means for adjusting the hoes toward and away from each other upon said rods, a crank shaft journaled in the frame, a pitman connecting said crank shaft and the hoes, and power transmission means on the crank shaft for rotating the same to oscillate said hoes.

2. A machine of the character described comprising a wheel supported frame, a transverse rod having its inner ends secured in said frame, said rod being disposed in parallel relation to and above the frame, a plurality of hoes mounted upon said rod for vertical oscillation and transverse sliding movement, rods connecting the hoe handles at their outer ends and intermediate of their ends, said handles being movable thereon, set screws extending through the handles for binding engagement upon the rods to secure the handles in their adjusted positions, a crank shaft journaled in the frame, a pitman connecting the crank on said shaft to the rear connecting rod of said hoes, and power transmission means for rotating said crank shaft to oscillate said hoes.

In testimony whereof I hereunto affix my signature in the presence of two witnesses.

TILLMAN A. ROSAMOND.

Witnesses:
   JNO. F. ADKINS,
   L. HOWELL.